US008645037B2

(12) United States Patent
Kato et al.

(10) Patent No.: US 8,645,037 B2
(45) Date of Patent: Feb. 4, 2014

(54) VEHICLE DRIVING APPARATUS AND CONTROL METHOD FOR SAME

(75) Inventors: Hajime Kato, Susono (JP); Hideto Watanabe, Toyota (JP); Yoshimitsu Yokouchi, Toyota (JP); Kunio Takeda, Kariya (JP); Masayuki Tanaka, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 168 days.

(21) Appl. No.: 12/679,592

(22) PCT Filed: Jan. 30, 2009

(86) PCT No.: PCT/IB2009/000156
§ 371 (c)(1),
(2), (4) Date: Mar. 23, 2010

(87) PCT Pub. No.: WO2009/095772
PCT Pub. Date: Aug. 6, 2009

(65) Prior Publication Data
US 2010/0286883 A1    Nov. 11, 2010

(30) Foreign Application Priority Data
Jan. 31, 2008    (JP) ................................. 2008-020901

(51) Int. Cl.
*B60W 10/18*    (2012.01)
*B60W 30/00*    (2006.01)
*G06F 19/00*    (2011.01)

(52) U.S. Cl.
USPC ............................................. 701/70; 477/194

(58) Field of Classification Search
USPC .............. 701/70, 99, 113; 903/902, 904, 905;
477/182, 184, 185, 188–194, 197–200
See application file for complete search history.

(56) References Cited

U.S. PATENT DOCUMENTS

| 7,243,748 B2 * | 7/2007 | Seksaria et al. ............ 180/65.31 |
| 2003/0154945 A1 | 8/2003 | Ando et al. |
| 2007/0170775 A1 * | 7/2007 | Uchimura et al. ............ 303/112 |
| 2007/0173984 A1 * | 7/2007 | Nakayama ........................ 701/1 |
| 2007/0200424 A1 * | 8/2007 | Sakai ................................ 303/3 |

FOREIGN PATENT DOCUMENTS

| DE | 19729354 A1 | 1/1998 |
| GB | 2315305 A * | 1/1998 |
| JP | 11-257114 A | 9/1999 |
| JP | 2000-127927 A | 5/2000 |
| JP | 2002-307982 A | 10/2002 |

* cited by examiner

*Primary Examiner* — John Q Nguyen
*Assistant Examiner* — Michael Whalen
(74) *Attorney, Agent, or Firm* — Sughrue Mion, PLLC (57) ABSTRACT

When the condition for starting an engine (50) is satisfied, the controller (90) executes the lock switching control in which the wheels (88) are forcibly locked by the brake device (86) and the parking lock mechanism (200) is released to unlock the driveshaft (step S4, step S5), and then the controller (90) executes the cranking control (step S6) in which the engine (50) is started by the motor-generator (MG1).

8 Claims, 4 Drawing Sheets

VEHICLE DRIVING APPARATUS AND CONTROL METHOD FOR SAME

BACKGROUND OF THE INVENTION

1. Field of the Invention

The invention relates to a vehicle driving apparatus and a control method of a vehicle driving apparatus. In particular, the invention relates to a vehicle driving apparatus and a control method of a vehicle driving apparatus including an internal combustion engine.

2. Description of the Related Art

Cranking control is executed in which the crankshaft of the internal combustion engine is cranked using an electric motor, when an internal combustion engine is started. Upon such a cranking control, as described in Japanese Patent Application Publication No. 2002-307982 (JP-A-2002-307982), if the temperature is low and thus the viscosity of lubricant is high, the load on the electric motor increases, and thus making it difficult to start the internal combustion engine. Further, low temperature causes a decrease in a voltage of a battery that powers the electric motor, and this further reduces the startability of the internal combustion engine.

A hybrid vehicle, which runs using both an engine and an electric motor(s), accomplishes a high fuel economy, by using the electric motor in an operation region where the fuel economy tends to be low. Therefore, the engine is often not started immediately after start-up of the hybrid vehicle.

However, when the atmospheric temperature is low, the engine is cranked by the electric motor at the same time as the start-up of the hybrid vehicle for heating of the vehicle compartment, system warming-up, and so on. However, because the voltage of the battery decreases at a low temperature, it takes longer to start the engine using the electric motor. Therefore, during the unstable state that is before the engine starts self-driving, a state where the engine is driven by the torque of the electric motor and a state where the engine drives the electric motor alternately occur. That is, the direction of the torque of the electric motor is repeatedly reverses, thereby causing vibrations at the parking lock gear, resulting in producing gear-contact noise between the parking lock gear and the parking lock pawl.

SUMMARY OF THE INVENTION

The invention provides a vehicle driving apparatus and a control method of a vehicle driving apparatus that reduce noise when starting an internal combustion engine.

The first aspect of the invention relates to a vehicle driving apparatus having: an engine; a motor for starting the engine; a driveshaft for receiving torque from the engine and driving wheels of the vehicle; a parking lock mechanism for locking the driveshaft; a brake device for locking the wheels; and a controller for controlling the motor, the parking lock mechanism, and the brake device. When a condition for starting the engine is satisfied, the controller executes a lock switching control in which the wheels are forcibly locked by the brake device and the parking lock mechanism is released to unlock the driveshaft, and then the controller executes a cranking control in which the engine is started by the motor.

The vehicle driving apparatus of the first aspect of the invention may be such that the controller locks the driveshaft using the parking lock mechanism and cancels the forcible locking of the wheels by the brake device after the engine starts self-driving after the cranking control.

The vehicle driving apparatus of the first aspect of the invention may further have a temperature sensor. In this case, the controller may execute the cranking control after the lock switching control if a temperature detected by the temperature sensor is lower than a predetermined temperature, and the controller may execute the cranking control without executing the lock switching control if the temperature detected by the temperature sensor is higher than the predetermined temperature.

The vehicle driving apparatus of the first aspect of the invention may be such that: the brake device incorporates a parking brake and a hydraulic brake; the controller forcibly lock the wheels using the hydraulic brake during the lock switching control; and the controller executes the cranking control without executing the lock switching control if the wheels are not locked by the parking brake.

The second aspect of the invention relates to a vehicle driving apparatus having: an engine; a motor for starting the engine; a driveshaft for receiving torque from the engine; wheels; a parking lock mechanism for locking the driveshaft; a wheel lock device for locking the wheels; and a controller for controlling the motor, the parking lock mechanism, and the wheel lock device. When a condition for starting the engine is satisfied, the controller executes a lock switching control in which the wheels are forcibly locked by the wheel lock device and the parking lock mechanism is released to unlock the driveshaft, and then the controller executes a cranking control in which the engine is started by the motor.

The vehicle driving apparatus of the second aspect of the invention may be such that the wheels include both drive wheels and driven wheels or include either of them.

The third aspect of the invention relates to a control method of a vehicle driving apparatus having an engine, a motor for starting the engine, a driveshaft for receiving torque from the engine and driving wheels of the vehicle, a parking lock mechanism for locking the driveshaft, and a brake device for locking the wheels. And the control method includes: determining whether a condition for starting the engine is satisfied; and executing a lock switching control in which the wheels are forcibly locked by the brake device and the parking lock mechanism is released to unlock the driveshaft, and then starting the engine using the motor when the starting condition is satisfied.

The method of the third aspect of the invention may further include locking the driveshaft by the parking lock mechanism and canceling the forcible locking of the wheels by the brake device after the engine starts self-driving after the cranking control.

The method of the third aspect of the invention may be such that the vehicle driving apparatus further has a temperature sensor; the cranking control is executed after the lock switching control if a temperature detected by the temperature sensor is lower than a predetermined temperature; and the cranking control is executed without executing the lock switching control if the temperature detected by the temperature sensor is higher than the predetermined temperature.

The method of the third aspect of the invention may be such that the brake device incorporates a parking brake and a hydraulic brake; the hydraulic brake is used to forcibly lock the wheels during the lock switching control; and the cranking control is executed without executing the lock switching control if the wheels are not locked by the parking brake.

According to the above aspects of the invention, it is possible to prevent gear-contact noise in the lock mechanism for locking the driveshaft and thereby reduce noises at the time of starting the internal combustion engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF AN EMBODIMENT

Hereinafter, an example embodiment of the invention will be described in detail with reference to the drawings. In the drawings, same elements and components are denoted by the same reference numerals, and their descriptions will not repeated.

Figure 1:
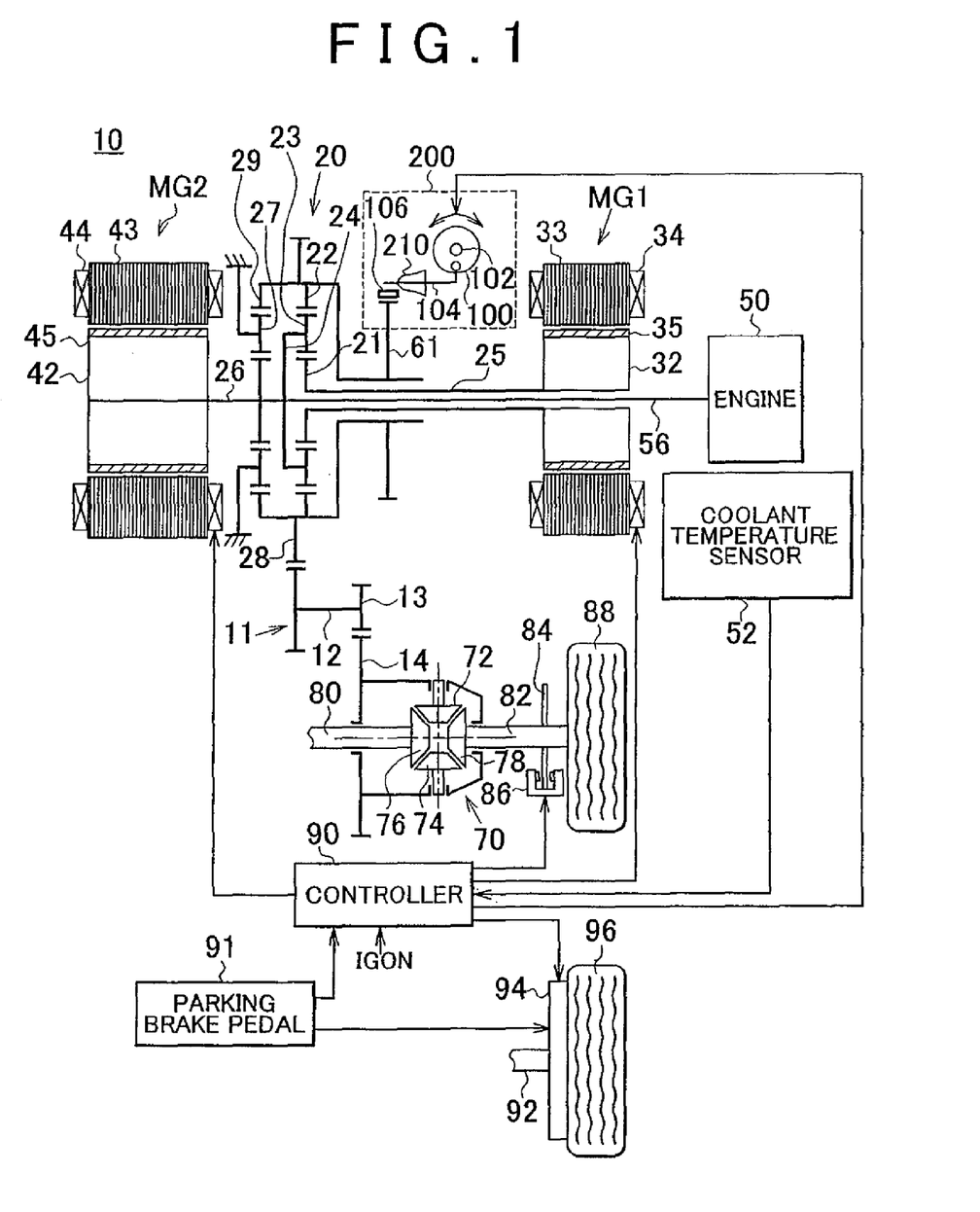
FIG. 1 is a view showing the configuration of a vehicle driving apparatus according to an example embodiment of the invention.

FIG. 1 schematically shows the configuration of a vehicle driving apparatus 10 according to the embodiment of the invention. Referring to FIG. 1, the vehicle driving apparatus 10 has an engine 50, a planetary gearset 20, motor-generators MG1, MG2, and a parking lock mechanism 200.

The planetary gearset 20 has a sun gear 21 coupled with a sun-gear shaft 25 that is a hollow shaft in which a crankshaft 56 penetrates axially, a ring gear 22 that has a rotational shaft arranged coaxially with the crankshaft 56, pinions 23 arranged between the sun gear 21 and the ring gear 22 so as to rotate itself while revolving around the sun gear 21, and a planetary carrier 24 that is secured to an end of the crankshaft 56 and on which the pinions 23 are rotatably supported.

Thus, the planetary gearset 20 has three drive-force input-output shafts, that is, the rotational shafts of the sun gear 21, the ring gear 22, and the planetary carrier 24. In operation, the drive forces to be output to or input from two of these three shafts are first determined, and then the drive force output to or input from the remaining one shaft is determined based on the determined drive forces for the two shafts.

As well as the ring gear 22, a ring gear 29 is formed at a ring gear case. A reduction gear unit is provided between the ring gear 29 and a rotor shaft 26 of the motor-generator MG2. The reduction gear unit is a planetary gearset. The carrier of the planetary gearset is fixed to a case. The rotation of the rotor shaft 26 is transferred from the sun gear to the ring gear 29 via pinions 27.

A drive-force input gear 28 for inputting drive force is provided at the outer periphery of the case of the ring gear 22. Drive forces are transferred between the drive-force input gear 28 and a drive-force transfer gear 11. The drive-force transfer gear 11 is coupled with a gear 13 via a rotational shaft 12. The gear 13 drives a differential unit 70. Upon driving on a downhill road, or the like, the rotations of wheels 88 are transferred to the differential unit 70, and the gear 13 is driven by the differential unit 70.

The differential unit 70 has a drive gear 14, pinions 72, 74, and side gears 76, 78. The drive gear 14 is provided on the outer periphery of a differential case (not denoted by any reference numeral) and rotates integrally with said case. The rotational shafts of the pinions 72, 74 are fixed on the differential case. The side gears 76, 78 are each arranged in mesh with the pinions 72, 74 and are coupled with driveshafts 80, 82, respectively, which are the rotational shafts of the wheels 88.

A brake disk 84 is provided on the driveshaft 82 that drives the wheel 88. A brake device 86 is provided at the outer periphery of the brake disk 84. The brake device 86 has a brake caliper, a hydraulic cylinder, a brake pad, and so on. A drum brake 94 is provided at each rear wheel 96.

Although not shown in detail, the drum brake 94 is constituted of two drum brakes, one for parking and the other for braking. When the wheel 96 is locked using the drum brake for parking, the brake shoe of said drum brake is opened and pressed against a drum by a wire that is operated via a brake pedal 91 (or a side-brake lever). On the other hand, when the wheel 96 is locked using the drum brake for braking, the brake shoe of said drum brake is opened and pressed against the drum by hydraulic pressure that changes in response to the brake pedal being operated or by hydraulic pressure that is controlled by a controller 90. Note that the drum brakes for braking the rear wheels may be replaced by disk brakes if necessary.

The motor-generator MG1 has a rotor 32 and a stator 33. Permanent magnets 35 are provided on the outer periphery of the rotor 32. A three-way coil 34 for creating rotational magnetic fields is wound around the stator 33. The rotor 32 is coupled with the sun-gear shaft 25 that integrally rotates with the sun gear 21 of the planetary gearset 20. The stator 33 is made of laminated thin electromagnetic steel plates. The stator 33 is fixed on a case that is not shown in the drawings.

When the motor-generator MG1 operates as a motor, the rotor 32 is rotated by the interactions between the magnetic fields created by the permanent magnets 35 and the magnetic fields created by the three-way coil 34. On the other hand, when the motor-generator MG1 operates as a power generator, electromotive forces are produced at the both ends of the three-way coil 34 by the interactions between the magnetic fields created by the permanent magnets 35 and the rotation of the rotor 32.

The motor-generator MG2 has a rotor 42 and a stator 43. Permanent magnets 45 are provided on the outer periphery of the rotor 42. A three-way coil 44 for creating rotational magnetic fields is wound around the stator 43. The rotor 42 is coupled with the rotor shaft 26. The stator 43 is made of laminated thin electromagnetic steel plates. The stator 43 is fixed on a case that is not shown in the drawings.

When the motor-generator MG2 operates as a power generator, electromotive forces are produced at the both ends of the three-way coil 44 by the interactions between the magnetic fields created by the permanent magnets 45 and the rotation of the rotor 42. On the other hand, when the motor-generator MG2 operates as a motor, the rotor 42 is rotated by the interactions between the magnetic fields created by the permanent magnets 45 and the magnetic fields created by the three-way coil 44.

The parking lock mechanism 200 has a parking lock gear 61 that integrally rotates with the ring gear 22, a parking lock pawl 106 for locking the parking lock gear 61, a parking lock cam 210 that pushes the parking lock pawl 106 into mesh with the parking lock gear 61, and a rod 104 that is attached to the parking lock cam 210 to move the parking lock cam 210.

The parking lock mechanism 200 has a parking lock actuator 142 for rotating a shaft 102. As the shaft 102 is rotated by the parking lock actuator 142, a detent plate 100 provided on the shaft 102 moves and thereby drives the rod 104. More specifically, as the shaft 102 is rotated clockwise, the parking lock cam 210 pushes the parking lock pawl 106 up, whereby the parking lock mechanism 200 is locked. Conversely, as the parking lock cam 210 is rotated counterclockwise (opposite to clockwise), the parking lock cam 210 is pulled away from the parking lock pawl 106, whereby the parking lock mechanism 200 is unlocked.

Figure 2:
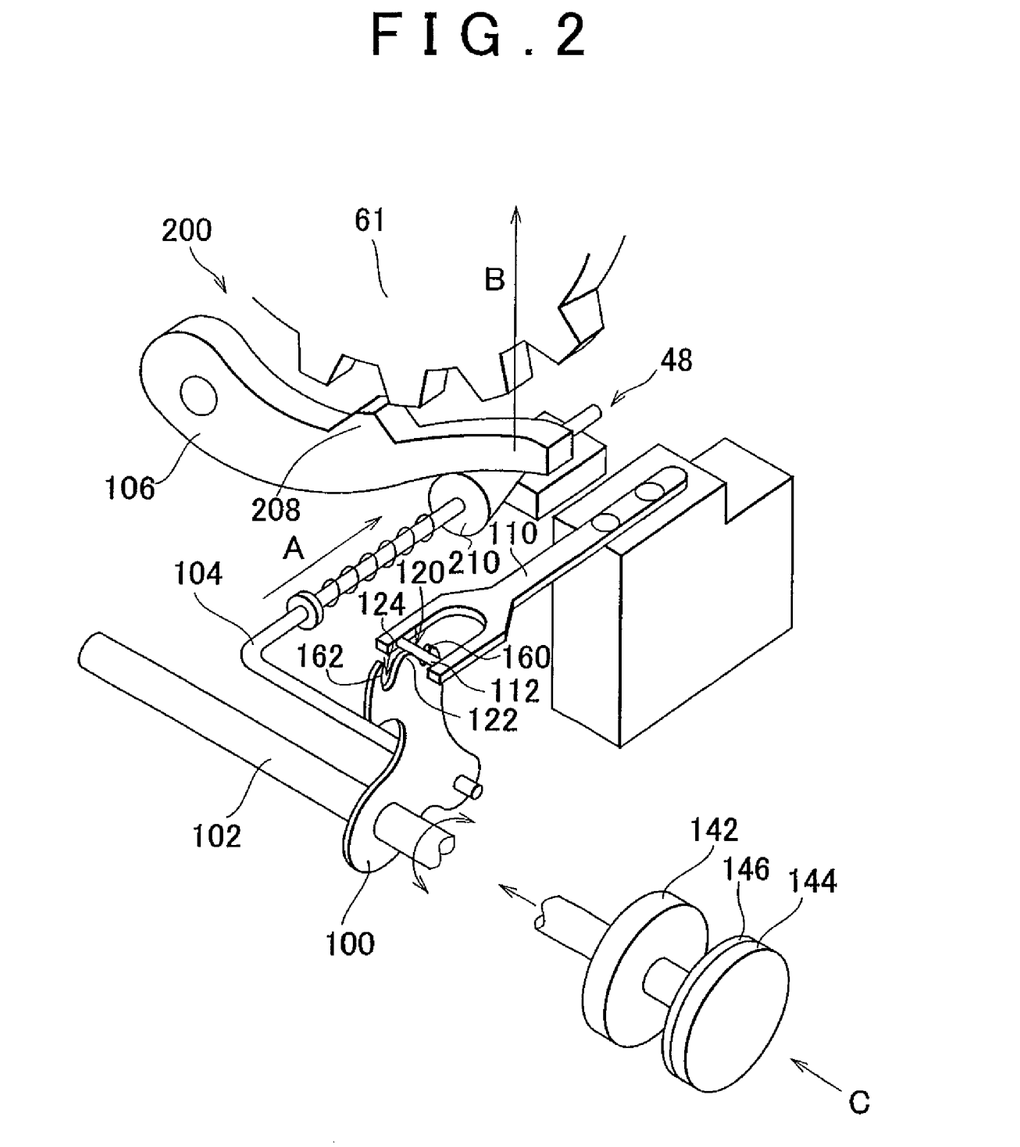
FIG. 2 is a detailed view showing a structure of a parking lock mechanism.

FIG. 2 shows the structure of the parking lock mechanism 200 in detail. Note that this example embodiment assumes that the shift position of the vehicle driving apparatus 10 is switched between two positions, P position (Parking position) and Non-P position. However, the vehicle driving apparatus 10 may have two or more Non-P positions, such as R (reverse) position, N (Neutral) position, D (Drive) position, and so on. For example, the shift position of the vehicle driving apparatus 10 may be switched between four shift positions, P position and three Non-P positions including R, N, and D positions.

As shown in FIG. 2, a shift-position changing mechanism 48 includes the shaft 102 that is rotated by the parking lock actuator 142, the detent plate 100 that rotates along with the shaft 102, the rod 104 that operates in accordance with the rotation of the detent plate 100, a parking lock gear 61 that is shown in FIG. 1, the parking lock pawl 106 that is used to lock the parking lock gear 61, a detent spring 110 that restricts the rotation of the detent plate 100 to fix the shift position at a predetermined position, and a roller 112.

The detent plate 100 is driven by the parking lock actuator 142 to change the shift positions. An encoder 146 functions as count means that obtains a count value corresponding to the rotation amount of the parking lock actuator 142. An output-shaft sensor 144 detects the rotational position of the shaft 102.

FIG. 2 shows the state in which the shift position is in Non-P position. In this state, because the parking lock pawl 106 does not lock the parking lock gear 61, the rotation of the driveshaft of the vehicle is not interfered with. If the shaft 102 is then rotated in the clockwise direction, when viewed in the direction of the arrow C, by the actuator 142, the rod 104 is pressed via the detent plate 100 in the direction of the arrow A in FIG. 2, whereby the parking lock pawl 106 is pushed up in the direction of the arrow B in FIG. 2 by a parking lock cam 210 that is a tapered cam provided at the tip of the rod 104.

As the detent plate 100 rotates, a roller 112 of the detent spring 110, which is positioned at one of the two indentations formed at the top portion of the detent plate 100, namely, a Non-P-indentation 120, climbs over a crest 122 and moves into the other indentation, namely, the a P-indentation 124. The roller 112 is fitted to a detent spring 110 so as to be rotatable about its axis. When the detent plate 100 rotates until the roller 112 reaches the P-indentation 124, the parking lock pawl 106 is pushed up to a position at which a projection 208 of the parking lock pawl 106 is placed between the teeth of the parking lock gear 61, whereby the rotation of the driveshaft of the vehicle is mechanically restricted.

In this example embodiment of the invention, the parking lock gear 61 is provided at a portion that integrally rotates with the ring gear 22 as shown in FIG. 1, and the parking lock mechanism 200 is provided to lock the parking lock gear 61. However, the parking lock mechanism 200 may be provided at any position between the driveshaft and the drive wheels 88.

Referring to FIG. 2, the parking lock mechanism 200 is constituted of the parking lock gear 61 and the parking lock pawl 106. The parking lock gear 61 is disk-shaped and has gear teeth formed along the rotational direction of the parking lock gear 61. Note that the parking lock gear 61 may be provided at other position, such as on a shaft meshed with the drive-force input gear 28.

The parking lock pawl 106 is pivotally supported, at one end, on the planetary gearset case. The projection 208 is provided at the center of the parking lock pawl 106 and interlocks with the teeth of the parking lock gear 61. The parking lock cam 210 is provided at the other end of the parking lock pawl 106 so as to be in contact with the parking lock pawl 106.

The parking lock cam 210 is formed in, for example, a conical shape. As the parking lock cam 210 moves in the direction of the arrow A in FIG. 2, the end of the parking lock pawl 106 pivotally moves in the direction of the arrow B in FIG. 2 along the slanted surface of the conical parking lock cam 210. The parking lock cam 210 is moved in the direction of the arrow A as the shift lever (not shown in the drawings) is moved to the position corresponding to the P-position. At this time, the parking lock cam 210 is driven by the detent plate 100 being rotated by the parking lock actuator 142.

As the parking lock cam 210 is thus driven, the projection 208 of the parking lock pawl 106 is placed between the teeth of the parking lock gear 61, whereby the parking lock gear 61 is locked. This is how the parking lock mechanism 200 locks the wheels 88 that are drive wheels.

Figure 3:
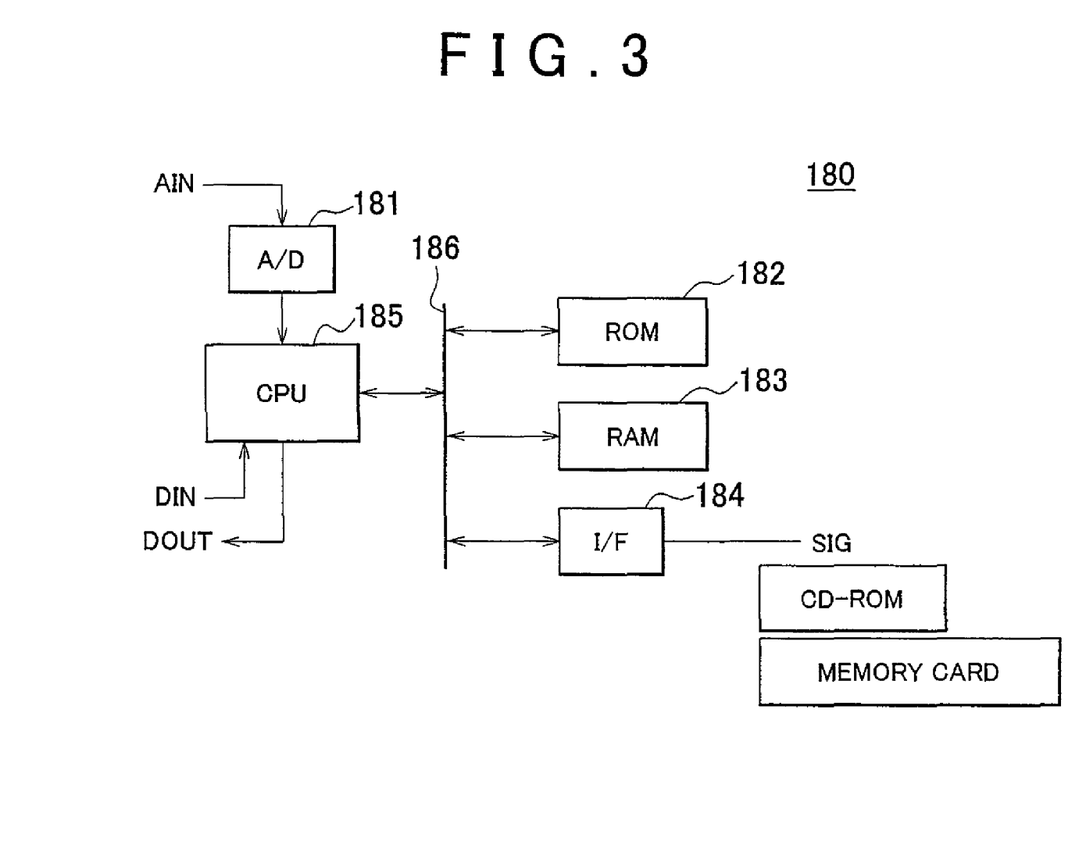
FIG. 3 is a view showing a configuration of a typical computer that is used as the controller.

FIG. 3 shows the configuration of a computer 180 that serves as the controller 90.

Referring to FIG. 3, the computer 180 includes a CPU (Central Processing Unit) 185, an A/D (Analogue/Digital) converter 181, a ROM (Read Only Memory) 182, and a RAM (Random Access Memory) 183, and an interface 184.

The A/D converter 181 converts analogue signals AIN output from various sensors, and the like, into digital signals and then output them to the CPU 185. The CPU 185 is connected to the ROM 182, the RAM 183, and the interface 184 via a bus 186 constituted of data buses, address buses, and so on, and the CPU 185 outputs various data to and inputs various data from them.

The ROM 182 stores various data, such as various programs executed by the CPU 185 and various maps used by the CPU 185. The RAM 183 provides work regions in which the CPU 185 executes various data processing, and it is used to temporarily record variants.

The interface 184 is used for, for example, communication between the host computer 180 and the ECUs (Electronic Control Unit) of other computers. In a case where the ROM 182 is a electrically rewritable memory (e.g., flash memory), the interface 184 may also used to write new data on the ROM 182. Further, the interface 184 is used to read in data signals SIG from computer-readable data storages, such as memory card, CD-ROM, etc.

The CPU 185 inputs data-input signals DIN to an input port and outputs data-output signals DOUT to an output port.

It is to be noted that the controller 90 is not limited to the structure described above. For example, the controller 90 may be constituted of a plurality of CPUs. Further, the controller 90 may be constituted of a plurality of ECUs that are separately provided, such as from an engine ECU, a brake ECU, a motor ECU, and so on.

Figure 4:
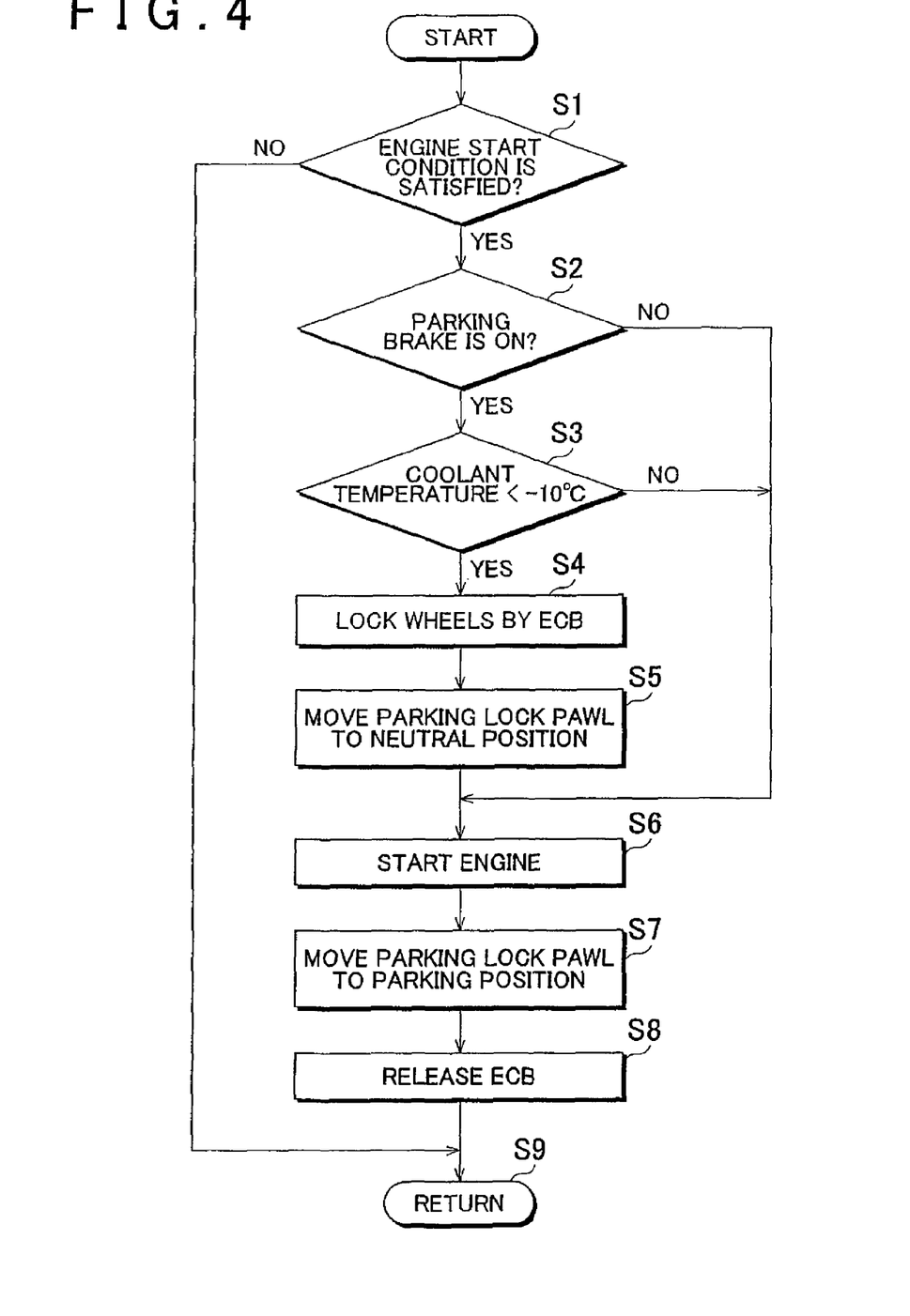
FIG. 4 is a flowchart illustrating the procedure of a routine executed by the controller.

The flowchart of FIG. 4 illustrates the procedure of a control routine executed by the controller 90. This control routine is executed when it is requested by a main engine control routine at regular time intervals or each time predetermined conditions are satisfied.

Referring to FIG. 1 and FIG. 4, the initial condition for starting the routine is that the parking lock pawl 106 is presently in engagement with the parking lock gear 61.

After the start of the routine, in step S1, the controller 90 determines whether an engine-start condition is presently satisfied. For example, the engine-start condition is determined as being satisfied when the start switch is pressed while the footbrake pedal is stepped down in a state where the charge level (SOC) of the battery is lower than a predetermined level or in a state where the temperature is low that the engine needs to be warmed up.

If it is determined in step S1 that the engine-start condition has been satisfied. The control then proceeds to step S2. Conversely, if it is determined in step S1 that the engine-start condition has not yet been satisfied, the control proceeds to step S9 and returns to the main engine control routine.

In step S2, the controller 90 determines whether the parking brake is presently ON. That is, in this routine, the wheels 88, 96 are locked using an electronic control brake in step S4, and then the parking lock pawl 106 is moved to the neutral position in step S5. The determination in step S2 is performed as fail-safe for an operation failure of the electronic control brake.

If it is determined in step S2 that the parking brake is presently ON, the control proceeds to step S3. In step S3, the controller 90 determines, based on the output of a coolant temperature sensor for detecting the temperature of the engine coolant, whether the coolant temperature is lower than −10° C. that is a reference temperature. This reference temperature is used to determine whether the voltage of the battery is presently as low as or the viscosity of the engine lubricant is presently as high as cranking of the engine 50 takes a long time. Therefore, the reference value is not limited to −10° C. but it may be changed for each vehicle having an engine of a specific type, a battery having a specific performance, and so on, or it may be newly set each time the engine 50 is started. The temperature to be compared with the reference temperature is not limited to the coolant temperature detected by the coolant temperature sensor, but it may be any other temperature, such as the one detected by other temperature sensor, as long as it is possible to determine whether the temperature of the engine, the temperature of the battery, or the like, is low.

If it is determined in step S3 that the coolant temperature is lower than −10° C., there is a possibility that the time needed for cranking the engine 50 becomes long that the vehicle occupants may be annoyed by the gear contact noises between the parking lock gear 61 and the parking lock pawl 106. Therefore, the controller 90 proceeds to step S4 and locks the wheels 88, 96 by actuating the disk brakes for the wheels 88 and the drum brakes for the wheels 96 via an ECB (Electronically Controlled Brake), whereby the vehicle is locked. Note that this ECB may correspond to "wheel lock device" of the invention. Then, in step S5, the controller 90 activates the parking lock actuator 142 to move the parking lock pawl 106 to the neutral position at which the parking lock pawl 106 is off the parking lock gear 61. When the parking lock pawl 106 is at the neutral position, no gear-contact noises occur between the parking lock pawl 106 and the parking lock gear 61, and therefore the noise level upon engine cranking in step S5 is kept low.

On the other hand, if it is determined in step S2 that the parking brake is not presently ON, the controller 90 starts the engine 50 in step S6 without executing the lock switching control in step S4 and step S5. This is done as fail-safe for an operation failure of the ECB, or the like.

Further, if it is determined in step S3 that the coolant temperature is higher than the reference temperature, that is, −10° C., the controller 90 starts the engine 50 in step S6 without executing the lock switching control in step S4 and step S5. That is, in this case, because the engine 50 can be easily started, the time required for engine cranking is not become long that the gear-contact noises annoy the vehicle occupants, and therefore it is not necessary to perform the lock switching control in step S4 and step S5. Note that the determination process in step S3 may be omitted and the lock switching control in step S4 and step S5 may be performed regardless of the temperature.

When the engine 50 has started self-driving after cranking in step S6, the controller 90 moves the parking lock pawl 106 to the parking position in step S7, and then releases the ECB in step S8. Note that the releasing of the ECB is not performed when the driver is depressing the footbrake pedal. After step S7 and step S8, the control returns to the main engine control routine in step S9.

Hereinafter, the embodiment of the invention will be summarized with reference to FIG. 1. The vehicle driving apparatus has: the engine 50; the motor-generator MG1 used to start the engine 50; the driveshaft that receives the torque from the engine 50 and drives the wheels 88; the parking lock mechanism 200 that is used to lock the driveshaft; the brake device 86 that is used to lock the wheels 88; and the controller 90 that controls the motor generator MG1, the parking lock mechanism 200, and the brake device 86 (that may be an ECB as in the example described above). When the condition for starting the engine 50 is satisfied, the controller 90 performs the lock switching control in which the wheels 88 (or the wheels 88, 96) are forcibly locked by the brake device 86 (that may be an ECB as in the example describe above) and the parking lock mechanism 200 is released to unlock the driveshaft, (step S4, step S5), and then executes the cranking control in which the engine 50 is started by the motor generator MG1 (step S6).

Preferably, the controller 90 locks the driveshaft using the parking lock mechanism 200 and cancels the forcible locking of the wheels 88 (or the wheels 88, 96) by the brake device 86 (that may be an ECB as in the example describe above) after the engine 50 starts self-driving.

Preferably, the vehicle driving apparatus further has a temperature sensor (coolant temperature sensor 52). If the temperature detected by the temperature sensor is lower than the predetermined temperature (step S3: YES), the lock switching control (step S4, step S5) is executed, and then the cranking control (step S6) is executed. If the temperature detected by the temperature sensor is higher than the predetermined temperature (step S3: NO), the cranking control (step S6) is executed without executing the lock switching control (step S4, step S5).

Preferably, the brake device 86 (that may be an ECB as in the example described above) includes a parking brake and a hydraulic brake. In this case, the controller 90 forcibly locks the wheels 88 (or the wheels 88, 96) using the hydraulic brake in the lock switching control (step S4, step S5). If the wheels 96 are not locked by the parking brake (step S2: NO), the controller executes the cranking control (step S6) by skipping the lock switching control (step S4, step S5).

Further, the foregoing description on the example embodiment of the invention may be regarded as description on a method for controlling the vehicle driving apparatus 10 having the engine 50, the motor-generator MG1 used to start the engine 50, the driveshaft that receives the torque from the engine 50 and drives the wheels 88, and the parking lock mechanism 200 that is used to lock the driveshaft, the brake device 86 that is used to lock the wheels 88. That is, this method includes: a step of determining whether the condition for starting the engine 50 has been satisfied (step S1); a step of executing the lock switching control in which the wheels 88 are forcibly locked by the brake device 86 and the parking lock mechanism 200 is released to unlock the driveshaft (step S4, step S5); and a step of starting the engine 50 by the motor-generator MG1 (step S6).

Preferably, the above-described control method for the vehicle driving apparatus 10 further includes a step of, after the engine 50 starts self-driving, locking the driveshaft by the parking lock mechanism 200 and canceling the forcible locking of the drive wheels 88 by the brake device 86 (step S7, step S8).

According to the forgoing structure and control procedure, as such, it is possible to reduce gear-contact noise in a hybrid vehicle when starting an engine at a low temperature and thus improve the comfort of the vehicle occupants.

The control procedures described above may be executed as software programs on the computer 180, and such programs may be stored in a data storage (ROM, CD-ROM, memory card) and read out into the computer 180 as needed, or they may be obtained via communication lines.

While the vehicle driving apparatus of the foregoing example embodiment has been incorporated in a series-parallel hybrid system that transfers drive force of the engine 50 to the drive axle and to the power generator via the drive-force distribution mechanism, the invention is not limited to such applications. That is, the invention may be applied to any vehicle that has an engine-starter motor, a parking lock mechanism, and an electronically controlled brake.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle driving apparatus, comprising:
   an engine;
   a motor for starting the engine;
   a driveshaft for receiving torque from the engine and driving wheels of the vehicle;
   a parking lock mechanism for locking the driveshaft;
   a brake device for locking the wheels;
   a controller for controlling the motor, the parking lock mechanism, and the brake device; and
   a temperature sensor that measures temperature of a coolant of the engine,
   wherein in response to satisfaction of a condition for starting the engine, the controller executes a lock switching control in which the wheels are forcibly locked by the brake device and the parking lock mechanism is released to unlock the driveshaft, and then the controller executes a cranking control in which the engine is started by the motor,
   wherein the controller locks the driveshaft using the parking lock mechanism and cancels the forcible locking of the wheels by the brake device in response to when the engine starts self-driving after the cranking control,
   wherein the controller executes the cranking control after the lock switching control if the temperature detected by the temperature sensor is lower than a predetermined temperature, and
   the controller executes the cranking control without executing the lock switching control if the temperature detected by the temperature sensor is higher than the predetermined temperature.

2. The vehicle driving apparatus according to claim 1, wherein:
   the brake device incorporates a parking brake and a hydraulic brake;
   the controller forcibly locks the wheels using the hydraulic brake during the lock switching control; and
   the controller executes the cranking control without executing the lock switching control if the wheels are not locked by the parking brake.

3. The vehicle driving apparatus according to claim 1, wherein:
   the brake device incorporates a parking brake and a hydraulic brake;
   the controller forcibly locks the wheels using the hydraulic brake during the lock switching control; and
   the controller executes the cranking control without executing the lock switching control if the wheels are not locked by the parking brake.

4. A control method of a vehicle driving apparatus having an engine, a motor for starting the engine, a driveshaft for receiving torque from the engine and driving wheels of the vehicle, a parking lock mechanism for locking the driveshaft, and a brake device for locking the wheels, and a temperature sensor that measures temperature of a coolant of the engine; the method comprising:
   determining whether a condition for starting the engine is satisfied; and
   executing a lock switching control in which the wheels are forcibly locked by the brake device and the parking lock mechanism is released to unlock the driveshaft, and then executing a cranking control in which the engine is started by the motor in response to satisfaction of a starting condition; and
   locking the driveshaft by the parking lock mechanism and canceling the forcible locking of the wheels by the brake device in response to when the engine starts self-driving after the cranking control;
   wherein the cranking control is executed after the lock switching control if the temperature detected by the temperature sensor is lower than a predetermined temperature; and
   wherein the cranking control is executed without executing the lock switching control if the temperature detected by the temperature sensor is higher than the predetermined temperature.

5. The method according to claim 4, wherein:
   the brake device incorporates a parking brake and a hydraulic brake;
   the hydraulic brake is used to forcibly lock the wheels during the lock switching control; and
   the cranking control is executed without executing the lock switching control if the wheels are not locked by the parking brake.

6. The method according to claim 4, wherein:
   the brake device incorporates a parking brake and a hydraulic brake;
   the hydraulic brake is used to forcibly lock the wheels during the lock switching control; and
   the cranking control is executed without executing the lock switching control if the wheels are not locked by the parking brake.

7. A vehicle driving apparatus, comprising:
   an engine;
   a motor for starting the engine;
   a driveshaft for receiving torque from the engine;
   wheels:
   a parking lock mechanism for locking the driveshaft;

a wheel lock device for locking the wheels;

a controller for controlling the motor, the parking lock mechanism, and the wheel lock device; and a temperature sensor that measures temperature of a coolant of the engine, wherein in response to satisfaction of a condition for starting the engine, the controller executes a lock switching control in which the wheels are forcibly locked by the wheel lock device and the parking lock mechanism is released to unlock the driveshaft, and then the controller executes a cranking control in which the engine is started by the motor, wherein the controller locks the driveshaft using the parking lock mechanism and cancels the forcible locking of the wheels by the wheel lock device in response to when the engine starts self-driving after the cranking control;

wherein the controller executes the cranking control after the lock switching control if the temperature detected by the temperature sensor is lower than a predetermined temperature, and the controller executes the cranking control without executing the lock switching control if the temperature detected by the temperature sensor is higher than the predetermined temperature.

8. The vehicle driving apparatus according to claim 7, wherein the wheels include both drive wheels and driven wheels or include either of them.

\* \* \* \* \*